(12) United States Patent
Qanaei

(10) Patent No.: US 8,955,764 B1
(45) Date of Patent: Feb. 17, 2015

(54) BUILDING HEAT EXCHANGE SYSTEM

(71) Applicant: Ahmd Abdallah Al-Jassem Qanaei, Salwa (KW)

(72) Inventor: Ahmd Abdallah Al-Jassem Qanaei, Salwa (KW)

( * ) Notice: Subject to any disclaimer, the term of this patent is extended or adjusted under 35 U.S.C. 154(b) by 0 days.

(21) Appl. No.: 14/062,842

(22) Filed: Oct. 24, 2013

(51) Int. Cl.
| | |
|---|---|
| *F23N 3/06* | (2006.01) |
| *F24H 6/00* | (2006.01) |
| *F24H 1/18* | (2006.01) |
| *F24H 3/02* | (2006.01) |
| *F24D 15/02* | (2006.01) |

(52) U.S. Cl.
 CPC ...................................... *F24H 6/00* (2013.01)
 USPC .................. 237/49; 237/16; 237/17; 237/8 A; 122/20 R; 52/169.11; 52/169.5; 52/302.1

(58) Field of Classification Search
 CPC ............. F23N 3/04; F23N 3/06; F24B 1/185; F24B 7/025; F24D 11/005; F24D 11/009; F24D 15/02; F24D 17/0005; F24D 2200/18; F24D 5/00; F24D 5/04; F24H 1/181; F24H 3/02; F24H 3/006; F24H 3/06; F24H 6/00; A01K 41/026
 USPC ................... 237/49, 16, 17, 8 A, 2 A, 15, 71; 122/20 R, 36; 52/2.11, 2.17, 169.5, 52/169.11, 302.1
 IPC ............................... F23N 3/06; F24H 1/18, 3/02
 See application file for complete search history.

(56) References Cited

U.S. PATENT DOCUMENTS

| | | | | |
|---|---|---|---|---|
| 917,483 | A | * | 4/1909 | Peck .............................. 237/9 R |
| 1,149,065 | A | * | 8/1915 | Keith et al. .................... 165/122 |
| 1,888,620 | A | * | 11/1932 | Clark ............................ 126/640 |
| 1,916,004 | A | * | 6/1933 | Langford ...................... 165/297 |
| 2,029,574 | A | * | 2/1936 | Knudsen ...................... 261/130 |
| 2,058,252 | A | * | 10/1936 | Parsons ........................ 392/347 |
| 2,203,187 | A | * | 6/1940 | Arter .............................. 237/49 |
| 2,225,023 | A | * | 12/1940 | Watt ............................... 237/17 |
| 2,268,789 | A | | 1/1942 | Watt |
| 2,507,011 | A | | 5/1950 | Hebert |
| 2,549,755 | A | | 4/1951 | Burwell |
| 2,658,502 | A | | 11/1953 | Severance |
| 3,269,382 | A | * | 8/1966 | Ronan et al. .................. 126/101 |

(Continued)

FOREIGN PATENT DOCUMENTS

| | | | |
|---|---|---|---|
| CN | 1657840 | 8/2005 | |
| EP | 1962030 A1 * | 8/2008 | .............. F24F 12/00 |

(Continued)

*Primary Examiner* — Gregory Huson
*Assistant Examiner* — Daniel E Namay
(74) *Attorney, Agent, or Firm* — Richard C Litman

(57) ABSTRACT

The building heat exchange system is suited for installation in areas having warmer seasonal climates. The system can include an external solar heated water supply, and an indoor water heater. An enclosure extends around the water heater, with indoor air flowing between the enclosure and water heater to a duct for distribution. During cooler conditions the water heater heats incoming water from the relatively cool external water supply, with the warmth of the water heater warming the air for distribution into the bathroom or other area as desired. In warmer times, the water supplied from the water supply can be sufficiently hot that additional heating is not needed, and can be hotter than desired. In such warmer conditions, the water heater can serve as a radiator, with heat radiated from the water heater being absorbed by air flowing past the water heater and expelled to the external environment.

1 Claim, 2 Drawing Sheets

(56) References Cited

U.S. PATENT DOCUMENTS

| | | | | |
|---|---|---|---|---|
| 3,404,674 | A | * | 10/1968 | Albert .......................... 126/101 |
| 3,977,601 | A | * | 8/1976 | Bearzi .......................... 126/586 |
| 4,018,581 | A | * | 4/1977 | Ruff et al. ..................... 237/2 B |
| 4,112,281 | A | * | 9/1978 | Epps ............................ 392/386 |
| 4,199,101 | A | * | 4/1980 | Bramow et al. ................. 236/13 |
| 4,640,458 | A | * | 2/1987 | Casier et al. ................... 237/17 |
| 4,646,966 | A | * | 3/1987 | Nussbaum ..................... 237/49 |
| 5,054,542 | A | | 10/1991 | Young et al. |
| 5,727,730 | A | * | 3/1998 | Habijanec et al. ....... 237/12.3 C |
| 7,866,168 | B2 | | 1/2011 | Gordon et al. |
| 2005/0087616 | A1 | * | 4/2005 | Attridge ...................... 236/91 D |
| 2009/0090788 | A1 | * | 4/2009 | Roques ........................ 236/20 R |
| 2011/0271948 | A1 | | 11/2011 | Redford |
| 2013/0319299 | A1 | * | 12/2013 | Handa et al. .................. 110/190 |
| 2014/0207288 | A1 | * | 7/2014 | Albrecht et al. .............. 700/276 |

FOREIGN PATENT DOCUMENTS

| | | | |
|---|---|---|---|
| JP | 8-86456 | | 4/1996 |
| JP | 2007170713 | A * | 7/2007 |
| JP | 2009204286 | A * | 9/2009 |

* cited by examiner

BUILDING HEAT EXCHANGE SYSTEM

BACKGROUND OF THE INVENTION

1. Field of the Invention

The present invention relates generally to air and water heat exchange systems, and more particularly to a building heat exchange system for selectively warming the air and/or heating water for use in a structure, such as a building or a household, as in a bathroom, or in another room or location.

2. Description of the Related Art

Many areas of the world have relatively warm climates, at least seasonally, and a significant amount of the world population lives in such areas. While such areas typically include the Middle East and North Africa, generally speaking the land areas from about thirty to forty degrees north of the equator to about thirty to forty degrees south of the equator are relatively warm, at least during large portions of the year, and also include, for example, the American southwest, as well as many other areas of the world.

While persons living in areas that are reasonably advanced technically can have access to such amenities as hot water for bathing, washing, and other purposes, it will be seen that the energy required to heat water can be reduced considerably through proper design and engineering in warmer areas of the world. Merely installing a water tank or reservoir on a rooftop or other area where it is subjected to the heat of the sun, can provide sufficient hot water for a structure, such as a building, a household or other facility, during warmer parts of the year throughout much of the world. In fact, it is possible to use a relatively small amount of energy, such as gas or electricity, for heating water in certain climates and seasons of the year, as solar heating can provide a relatively large part of the heat required for such purposes.

However, the relatively large amount of solar heating available in warmer climates can also produce uncomfortably high temperatures in structure interiors, such as in a building or a household, at least during the warmer seasons of the year. An approach to address a need for heated water and relatively cool interior air has been to expend energy in heating the water and in air conditioning to cool the air in the interior of a structure during warmer seasons of the year, and then to expend more energy to heat the water but also to warm the interior air during cooler times of the year.

Accordingly, a number of systems have been developed in attempts to reduce energy consumption and to provide greater year round comfort in households and other facilities. An example of such is found in Japanese Patent Publication No. 8-86456 published on Apr. 2, 1996 to Fujitsu General Ltd. This reference describes a heating system using hot water from an exterior heater, with the hot water passing through a water-to-air heat exchanger within the building structure. The system includes automatic water shutoffs in the event that the interior heat exchanger is tipped over.

Another example system is found in Chinese Patent Publication No. 1657840 published on Aug. 24, 2005 to Zhao Honghai. This reference describes a combination heater unit for simultaneously heating water and warming the air in a bathroom.

Thus, a household heat exchange system addressing the aforementioned problems is desired.

SUMMARY OF THE INVENTION

Embodiments of a building heat exchange system make use of solar heated water from an external tank to supply warm water for a structure, such as a building or a household, use during warmer times of the year, thus greatly reducing or substantially eliminating the need for energy expenditure for heating water. The system can be adapted to provide heated water using a heating device, such as using gas or electricity, during cooler times of the year, with the building heat exchange system also serving to warm the air for a room of the structure, such as the bathroom or other room, as desired.

The building heat exchange system includes a water heater having a heating means or a heating device, e.g., using gas, electricity, etc. An enclosure, such as can include a jacket, is installed about the water heater, and spaced apart therefrom to allow substantially free airflow in a space formed between the enclosure and the exterior of the water heater. Air passing through this space flows to the top of the water heater where a fan propels the air into a duct system for routing to a room or rooms in a structure, such as a building or a household, for example. During cooler times of the year, the warmed air can be routed into a bathroom or other room of the structure, such as a room or rooms of a building or a household, to assist in heating the room or rooms, as desired. During warmer times of the year, the warmed air can also be expelled from the structure, such as a building or a household.

In embodiments of a building heat exchange system, water is provided to the structure, such as a building or a household, by an external water storage tank or cistern that is desirably exposed to the sun. Generally, solar heating can be sufficient to heat the water in the storage tank to the extent desired during warmer months of the year. In such warmer conditions, the heating device or heating means of the water heater to heat the water in the water tank can be turned off, to the extent not needed to heat the water. In fact, the incoming water from the external storage tank can be warmer than desired and, as such, the relatively hot water can flow into the water heater. The enclosure surrounding the water heater allows relatively cool air from within at least a portion of the structure, such as a building, a household or other structure, to pass around the water heater and absorb heat radiated from the water heater, with the water heater thus acting as a radiator. The warmed air is then expelled to the outside of the structure, such as a building, a household or other structure, such as by adjusting the valves in the duct to expel the heated air, while blocking airflow back into at least a portion of the structure, such as a bathroom or other interior area of the structure, such as a building, a household or other structure.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Embodiments of a building heat exchange system can be particularly suited for locations with relatively warm climates for at least some portion of the year. The building heat exchange system makes use of heated water from an externally disposed water tank or cistern that receives solar heat during the day during warmer months, and delivers the water into the building, such as a household or other structure, for use therein. The heated water is then cooled with air to remove any excess heat. The warm air is then expelled from the building, such as a household or other structure. In cooler conditions, the water heater can use a heating device or heating means to heat the water in the water tank, and the building heat exchange system warms the air by heat from the water in the water heater to warm one or more rooms of the building, such as a household or other structure.

Figure 1:
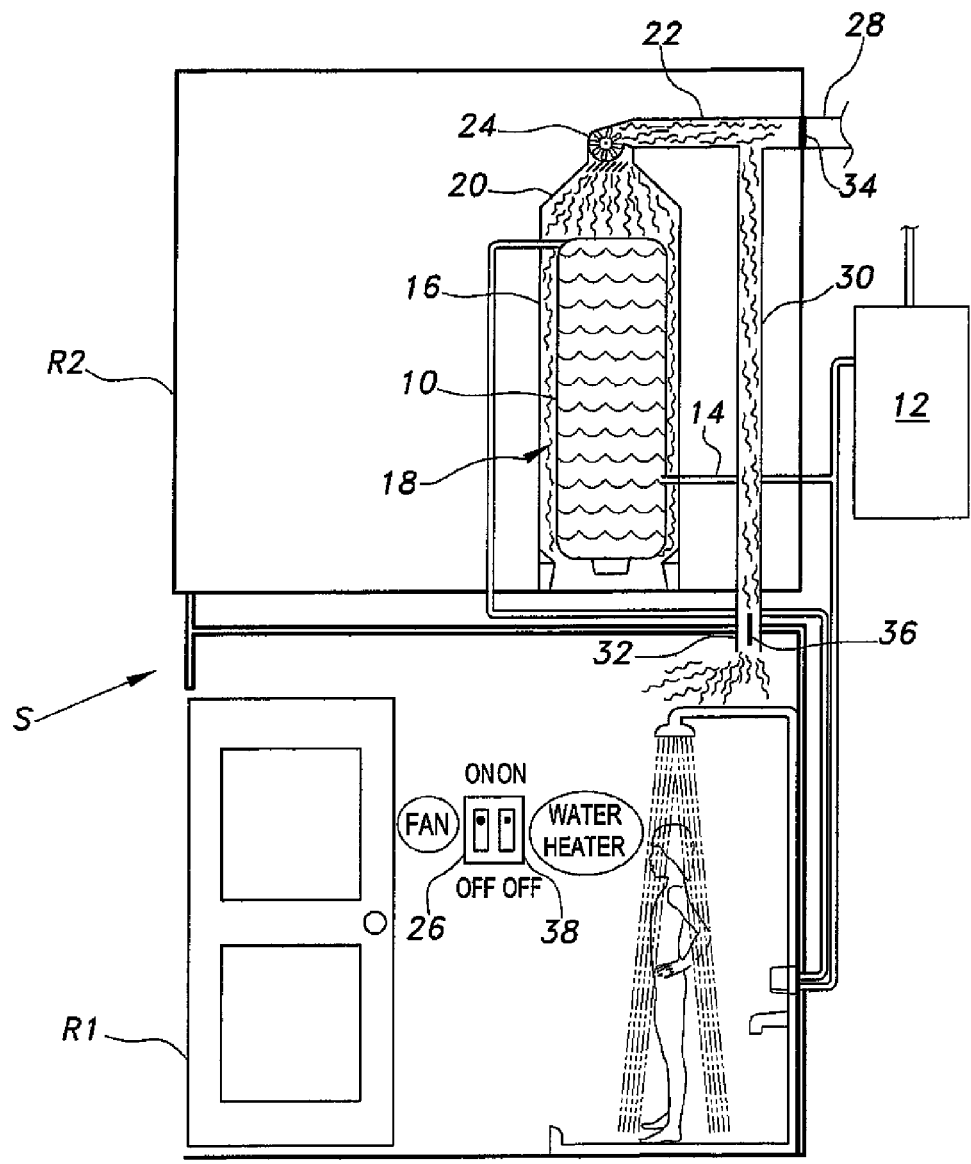
FIG. 1 is a schematic view of an embodiment of a building heat exchange system according to the present invention, showing a configuration for operation in cooler ambient temperatures.
Figure 2:
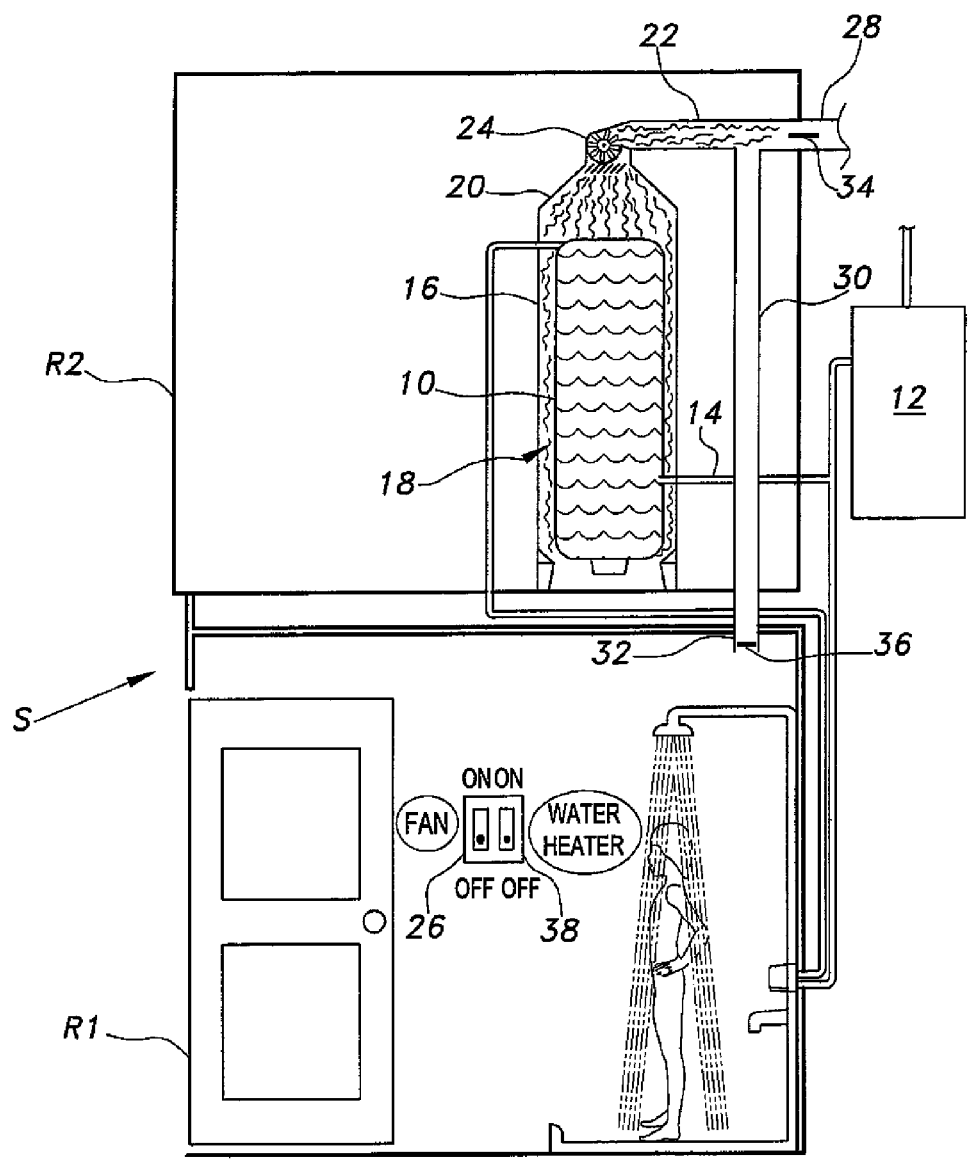
FIG. 2 is a schematic view of an embodiment of a building heat exchange system according to the present invention, showing a configuration for operation in warmer ambient temperatures.

Referring to FIG. 1, FIG. 1 of the drawings illustrates a schematic view of an embodiment of a building heat exchange system, the building heat exchange system as installed in conjunction with at least a portion of an exemplary structure S, such as a building, e.g., a household or other closed structure, with a controller or one or more controls of the building heat exchange system configured or set for operation for winter or cooler conditions. Also, referring to FIG. 2 of the drawings, FIG. 2 illustrates a schematic view of an embodiment of a building heat exchange system, similar to the building heat exchange system of FIG. 1, the building heat exchange system as installed in conjunction with at least a portion of the exemplary structure S, such as a building, e.g., a household or other closed structure, but with the controller or one or more controls of the building heat exchange system of FIG. 2 configured or set for operation for summer or warmer conditions.

The structure S can include any of various buildings, such as a home, apartment, or other living quarters, and can include one or more rooms, and a first room R1 has a first internal volume and a second room R2 has a second internal volume, for example. It will be seen that the term "room" can encompass any of various rooms of a structure S, such as bathrooms, bedrooms, kitchens, living rooms or other living areas, and can also include closets, small utility rooms, etc., not normally used as living quarters per se, but such rooms would typically contain or be defined by at least some internal volume.

For example, the second room R2 has a second internal volume and can include a storage or utility area or other room having a water heater 10 installed therein, the water heater 10 including a water tank to receive water from a water supply, and the first room R1 has a first internal volume and can include a bathroom or other room in a living area of the structure S, for example. The two rooms R1 and R2 can be in two different floors of the structure S, as shown in FIGS. 1 and 2, or can be on the same floor of the structure S or can be in other arrangements than shown in the drawing FIGS. 1 and 2.

A water storage tank 12, such as can include a cistern or other type of storage tank or water storage facility, is installed exteriorly to the structure S, such as where the water storage tank 12 can receive direct radiation from the sun to heat the water therein by solar energy. The water storage tank 12 can have a different configuration than that shown, such as depending upon a type of the structure S or location in a structure S, as well as to enhance solar heating of the water therein, if so desired. The water storage tank 12 supplies water to the water heater 10, the supplied water being received in the water tank of the water heater 10, by a water supply line 14 extending therebetween. In the winter or in cooler conditions, the water from the water storage tank 12 is typically not relatively as warm as in warmer conditions, so the water heater 10 can be used to heat the water therein, such as by a heating means or a heating device, e.g., using gas, electricity, etc., as typically included in a water heater, for example. Also, the source of the water supplied through the water supply line 14 to the water tank of the water heater 10, or supplied to the water storage tank 12, can be from another water supply, such as a municipal water supply, a community water supply, or a well water supply, for example, and therefore should not be construed in a limiting sense.

In embodiments of a building heat exchange system, such as illustrated in FIGS. 1 and 2, an airflow enclosure 16 is installed about the water heater 10, with the water heater 10 and the airflow enclosure 16 defining an airflow passage 18, such as an annular airflow passage, therebetween. The airflow passage 18 is open to ambient room air at the bottom of the water heater 10, and the airflow enclosure 16 has an outlet 20, such as conical outlet, at its upper end above the water heater 10.

An air duct 22 extends from an end of the outlet 20, to convey air that has passed around the water heater 10 and is heated by heat from the water in the water heater 10 to other locations, as desired, with the heat radiated from the water heater 10 being absorbed by air flowing past the water heater 10 through the airflow passage 18. An air fan 24 is installed within the outlet 20, such as at an end of the outlet 20, of the airflow enclosure 16, such as at the entrance to the air duct 22 to move the air through the airflow passage 18 and from the airflow passage 18 into the air duct 22. The air fan 24 is selectively controlled to move the warmed air, as well as the air fan 24 can assist in drawing air into or drawing air through the airflow passage 18, such as controlled by a fan control switch 26, such as a conventional control switch, or other suitable controller, in communication with the air fan 24, to selectively control the air fan 24 to control movement of the warmed air. The electrical wiring for the air fan 24 and the fan control switch 26 are not shown, but are conventional. The air fan 24 can serve to and can assist in drawing air into, through or from the airflow passage 18 and can assist in moving or propelling the air through the air duct 22 so as to be provided to one or more branches of a duct system associated with the structure S, for example.

In a duct system associated with the structure S, for example, an exhaust branch duct 28 extends from the interior air duct 22 to pass through the wall of the structure S to the exterior of the structure S. The exhaust branch duct 28 allows the warmed air to pass from or be exhausted from the structure S, when such warmed air is not desired within the structure S. Also, the duct system associated with the structure S can include one or more interior branch ducts to provide the warmed air to one or more portions or rooms of the interior of the structure S. For example, an interior branch duct 30 extends from the air duct 22 to an outlet end 32 of the interior branch duct 30 within the structure S, such as to discharge the warmed air into the first room R1 having the first internal volume, as for example, when the room R1 is used as a bathroom. In this manner, air warmed by passage around the water heater 10, such as through the airflow passage 18, can be passed or provided to the first room R1, such as a bathroom of the structure S, as well as to other rooms of the structure S, to warm the interior thereof.

Airflow through the exhaust branch duct 28 and through the interior branch duct 30 can be selectively directed or selectively controlled, for example, by a plurality of selectively operable valves installed in the respective branches. An air exhaust valve 34 can be installed at a suitable point in the exhaust branch duct 28, e.g., at a point where the exhaust branch duct 28 passes through a wall of the structure S to exhaust the warmed air from the structure S to the outside environment, such as to the exterior of the structure S. Also, an air outlet valve 36 can be installed in the interior branch duct 30, e.g., at the outlet end 32 thereof, to selectively direct and control the warmed air flow into the interior branch duct 30 and through the outlet end 32. These two valves 34 and 36 can be controlled by a suitable controller or control device, e.g., a processor, solenoids, etc., and can be operated independently of one another. Further, a single valve can be installed at the juncture of the exhaust branch duct 28 and the interior branch duct 30 to selectively direct or selectively control the air flow, for example. However, use of a single valve to direct airflow can possibly limit options in directing airflow in a duct system for the structure S relative to that as can be provided by use of a plurality of valves, such as provided by the independent operation of the two valves 34 and 36.

Continuing with reference to FIG. 1, as discussed, the building heat exchange system illustrated therein is configured for winter operation or operation in relatively colder conditions. In these relatively colder conditions, the water from the external water storage tank 12 or from another water supply is not typically heated appreciably and can be relatively cool as it enters the structure S. Accordingly, a heating means or a heating device, e.g., using gas, electricity, etc. of the water heater 10 is turned on to heat the water as typically included in a water heater, for example. The air within the structure S is often relatively cool, as well, when the external air is relatively cool, and persons within the structure S can desire to economize on internal heating costs for the structure S. Such economizing on internal heating costs can result in uncomfortably cool temperatures in a room or rooms of the structure S, such as a bathroom, particularly when a person is bathing and water is evaporating from their exposed skin. Accordingly, embodiments of a building heat exchange system can use heat from the water in the water heater 10 to warm the air within the structure S.

As illustrated in FIG. 1, for example, air flows into the bottom opening of the airflow passage 18, such as an annular airflow passage, around the water heater 10, and rises upward as it is warmed, with heat radiated from the water heater 10 being absorbed by air flowing past the water heater 10 through the airflow passage 18. The air fan 24 at the top of the airflow enclosure 16 can be selectively activated by the fan control switch 26 to assist, as well as can selectively control, the airflow, particularly as the air flow is directed downward, such as into the interior branch duct 30, after leaving the airflow passage 18. The air exhaust valve 34 can be closed or partially closed, thus diverting all, or a portion of, the air in the air duct 22 into the interior branch duct 30. The air outlet valve 36 is open or partially open, allowing all, or a portion of, the warmed air to flow into the bathroom or other room R1 of the structure S, such as to enhance the comfort of a person therein, for example.

Continuing now with reference to FIG. 2, as discussed, the building heat exchange system illustrated therein is configured for summer operation or operation in relatively warmer conditions. In the summer in some areas of the world, the water in the water storage tank 12 or from another water supply can be heated to a temperature that is higher than desired. The heated water, such as solar heated water, can reach a temperature on the order of fifty degrees Celsius, or 122 degrees Fahrenheit, for example. Such water temperatures do not typically require any supplemental heating by a heating means or heating device associated with the water heater 10.

Accordingly, a heating means or a heating device, e.g., using gas, electricity, etc. of the water heater 10, as is typically included in a water heater, can be selectively controlled in an on state or an off state, such as selectively turned off in such relatively warmer temperatures, by means of a water heater control switch 38, such as a conventional control switch, or other suitable controller, in communication with the heating means or the heating device of the water heater 10. The electrical wiring for the water heater control switch 38 to selectively control the on state and the off state of the heating means or heating device of the water heater 10 is not shown, but is conventional.

In such relatively warmer conditions, in embodiments of a building heat exchange system, hot water from the water storage tank 12 or from another water supply still flows to the water heater 10 for distribution through the hot water supply system of the structure S, but it is typically not necessary to heat the water further as it passes through the water heater 10. In fact, it can be desirable to remove some of the excess heat from the water in the water heater 10.

Embodiments of a building heat exchange system can also allow air within the structure S, such as within the room R2 that includes the water heater 10, to flow through the airflow passage 18, such as an annular airflow passage, around the water heater 10, with this air absorbing heat from the water in the water heater 10. The air within the structure S can be much cooler than the temperature of the water within the water heater 10, particularly when the air within the structure S has been cooled by air conditioning or other cooling means, for example.

The air thus warmed by passing around the water heater 10 through the airflow passage 18, with heat radiated from the water heater 10 being absorbed by air flowing past the water heater 10 through the airflow passage 18, flows upward into the interior air duct 22 extending from an end of the outlet 20 of the airflow enclosure 16, where it is expelled from the structure S, such as by selectively controlling opening, or partially opening, the air exhaust valve 34. The air fan 24 can be selectively activated and selectively controlled by means of the fan switch 26 to assist in drawing air past the water heater 10 and out of the structure S, as well as to selectively control the airflow, but the air can tend to flow in the desired direction in any event as it is warmed and rises. As such, the air outlet valve 36 into the first room R1 (e.g., a bathroom) can be selectively controlled to be closed, as desired, to substantially prevent the relatively warm air from flowing back into the structure S, or the air outlet valve 36 can be selectively controlled to be partially closed, for example, to control the air flow into the first room R1, for example.

It will be seen that the various ducts and plumbing described herein need not be limited to the bathroom(s) of the structure S, such as a building, a residential structure, a household or other structure. Also, embodiments of a building heat exchange system can be used to control or adjust the temperature in one or more rooms of the structure S by utilizing air warmed by heat from water in a water heater to warm one or more rooms of the structure S, such as a kitchen, a laundry room, and/or to any other area within the structure S that can require heat from time to time. Similarly, the air ducts of a duct system for the structure S described herein can be routed to other areas of the structure S than the bathroom in order to control or adjust temperatures in those other areas, as desired.

It is to be understood that the present invention is not limited to the embodiments described above, but encompasses any and all embodiments within the scope of the following claims.

I claim:

1. A heat exchange system for use in a structure, the heat exchange system consisting of:

a water tank disposed within the structure adapted to receive water from a water supply;

an airflow enclosure disposed about the water tank, the airflow enclosure and the water tank defining an airflow passage therebetween for ambient air to flow, the airflow enclosure having an outlet end disposed above the water tank;

an air fan disposed within the outlet end of the airflow enclosure to move the air through the airflow passage and the warmed air into the air duct;

an air duct extending from the airflow enclosure;

an interior branch duct communicating with the airflow enclosure, the interior branch duct adapted to extend into at least one interior of the structure;

an exhaust branch duct communicating with the airflow enclosure, the exhaust branch duct adapted to extend outside the structure;

a first selectively operable control switch communicating with the air fan to selectively control the air fan to control moving the air through the airflow passage and the warmed air into the air duct;

a selectively operable air exhaust valve disposed within the exhaust branch duct to selectively direct the warmed air to exhaust the warmed air from the structure; and a second selectively operable control switch communicating with the water tank to selectively control a heating of the water in the water tank;

a selectively operable air outlet valve disposed within the interior branch duct to selectively direct the warmed air to the at least one interior of the structure;

wherein the ambient air flowing through the airflow passage selectively cools the water tank and the water of excess heat therein and warmed air from cooling is directed from the outlet end of the airflow enclosure to exhaust the warmed air from the structure via the exhaust branch duct, thereby reducing the temperature of the water within the water tank; and wherein the ambient air flowing through the airflow passage is warmed by heat from water in the water tank radiated by the water tank and the warmed air is selectively directed from the outlet end of the airflow enclosure, via the air duct, to the at least one interior of the structure, via the interior duct, to warm the at least one interior.

* * * * *